United States Patent [19]
Bobbitt, Jr.

[11] 3,992,860
[45] Nov. 23, 1976

[54] TOWED TOBACCO HARVESTER

[76] Inventor: Louis W. Bobbitt, Jr.; Bobbitt's Farm Supply, Castalia, N.C. 27816

[22] Filed: Feb. 10, 1975

[21] Appl. No.: 548,740

[52] U.S. Cl. .............................................. 56/27.5
[51] Int. Cl.² .......................................... A01D 45/16
[58] Field of Search ................ 56/27.5; 198/84, 102

[56] References Cited
UNITED STATES PATENTS

| | | | |
|---|---|---|---|
| 3,417,556 | 12/1968 | Jones et al. | 56/27.5 |
| 3,695,014 | 10/1972 | Alphin et al. | 56/27.5 |
| 3,731,475 | 5/1973 | Batthes | 56/27.5 |
| 3,772,862 | 11/1973 | Wilson | 56/27.5 |
| 3,834,137 | 9/1974 | Long | 56/27.5 |
| 3,841,071 | 10/1974 | Pinkham et al. | 56/27.5 |

*Primary Examiner*—Russell R. Kinsey
*Attorney, Agent, or Firm*—Fleit & Jacobson

[57] ABSTRACT

A harvesting apparatus adapted to be towed by a standard tractor, and capable of automatically removing tobacco leaves from their respective stalks. The removed leaves are fed to a cart also being towed by the tractor. The tobacco leaves are stripped from the stalks by a pair of rotating defoliators centrally positioned in the harvesting apparatus, and transported up the outside walls of the harvester by way of a plurality of associating spaced transport belts, and are dropped onto a conveyor system for delivery to the towed cart. Also disclosed is a mechanism by which the spacing between the towing tractor and the defoilator blades can be adjusted to change the tobacco row undergoing harvest. Furthermore, there is disclosed a mechanism by which the towed harvester can be adjusted so as to strip all of the tobacco leaves off of the stalks or to remove only the leaves in select regions of the stalks.

10 Claims, 5 Drawing Figures

TOWED TOBACCO HARVESTER

BACKGROUND OF THE INVENTION

With the growth of the tobacco industry, numerous tobacco harvesters have been developed and marketed. One well-known harvester includes a mechanism by which tobacco leaves are transported to a storage bin after being inserted between pairs of moving conveyor belts. A drawback of this known harvester is that the tobacco leaves must be manually removed from the stalk and introduced to the conveyor system.

Another popular tobacco harvester is a self-propelled automatic unit which strips select tobacco leaves from their stems and transports the removed leaves to a cart carried by the harvesting unit. This unit required a complex conveyor arrangement to move the tobacco leaves to the cart, as well as a mechanism by which the cart is lifted off the ground and brought into association with the discharge end of the conveyor unit. This harvester is quite large, and correspondingly expensive.

Recently, a harvester has been introduced to the market which is towed by a tractor, and which is automatic. A significant drawback of this harvester is that all of the leaves are stripped from the stems. Therefore, the large and small, top and bottom leaves are comingled, a feature resisted both by the farmer and the tobacco industry. Another drawback of this new harvester is that the tobacco stalks must be maintained below a given height, or else the stripping action of the harvester will be impaired.

It is toward the elimination of the disadvantages noted above that the present invention is directed.

SUMMARY OF THE INVENTION

The present invention relates to an automatic tobacco harvester of simplified design, relatively small size and a correspondingly low cost which is capable of harvesting tobacco crops with high efficiency.

The inventive automatic tobacco harvester is designed to be towed by a conventional tractor. This feature results in a significant reduction in cost from the self-propelled harvester presently known in the industry, since the tractor is among the farm equipment generally owned by the tobacco grower.

It is accordingly one object of the present invention to provide a simplified, low-cost automatic tobacco harvester which can be towed by a conventional tractor.

The inventive tobacco harvester is equipped with a simple, and yet quite effective conveyor mechanism by which the stripped tobacco leaves are transported from the defoliator to a tobacco-receiving cart also being towed by the tractor.

Each of the two substantially vertical side frames of the inventive harvester is equipped with a continuous chain which moves upwardly on the exterior of the frame. A plurality of relatively narrow V-belts are also mounted on each of the side frames, on the exterior and in contact with the respective continuous chains. The chains and belts are driven in unison, and the stripped tobacco leaves are carried between the respective chains and belts, from the region of the defoliating blades, up the exterior of the side frames and onto a conveyor belt at the top of the harvester. By employing the plurality of narrow belts on the outside frame of the harvester, both large and small tobacco leaves, or portions of leaves, are efficiently carried to the trailing cart without damage.

It is accordingly another object of the present invention to provide a simplified, effective and gentle transportation mechanism by which tobacco leaves can be carried from the defoliating blades to the storage cart.

As noted above, the tobacco leaves are carried away from the defoliator by the cooperating chain and narrow belts in a substantially vertical direction. The chain-belt conveyor terminates at a location immediately above the defoliator, where the tobacco leaves are discharged onto a conventional wide-belt conveyor for removal to the cart carried directly behind the towing tractor. With such an arrangement, it is unnecessary to physically carry or otherwise lift the storage cart to associate with the discharge end of the wide-belt conveyor system. Rather, the cart is simply towed by the conventional tractor.

It is accordingly yet another object of the present invention to provide a compact and simplified automatic tobacco harvester in which the tobacco leaves removed from their stalks are carried to a cart towed by the same tractor which tows the harvester itself.

Tobacco is planted in rows which are spaced approximately 48 inches apart. To enable a harvester to travel across the tobacco field without injury to the crop, it has become common practice to leave every fifth row unplanted, and therefore free from tobacco. This fifth row constitutes an aisle approximately 96 inches wide, and serves as a path along which farm machinery such as tractors can travel. The inventive tobacco harvester is provided with a mechanism by which an entire tobacco field can be harvested with the towing tractor always riding along the fifth unplanted row. This is accomplished through an adjustment which places the defoliator in one of two basic positions. In the first position, the defoliator associates with the first row of tobacco immediately adjacent the fifth free row in which the towing tractor travels. The second position associates the defoliator with the next adjacent row of tobacco, that is, the second row from the unplanted row. In harvesting a field, the tractor traverses each unplanted row four times, twice in one direction and twice in the opposite direction. In each direction, one pass is made with the harvester frame immediately adjacent the tractor, and one pass with the frame in its more remote position.

It is therefore still a further object of the present invention to provide an automatic tobacco harvester which is towed by a conventional tractor, and which is adjustable to facilitate the harvesting of an entire tobacco field.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
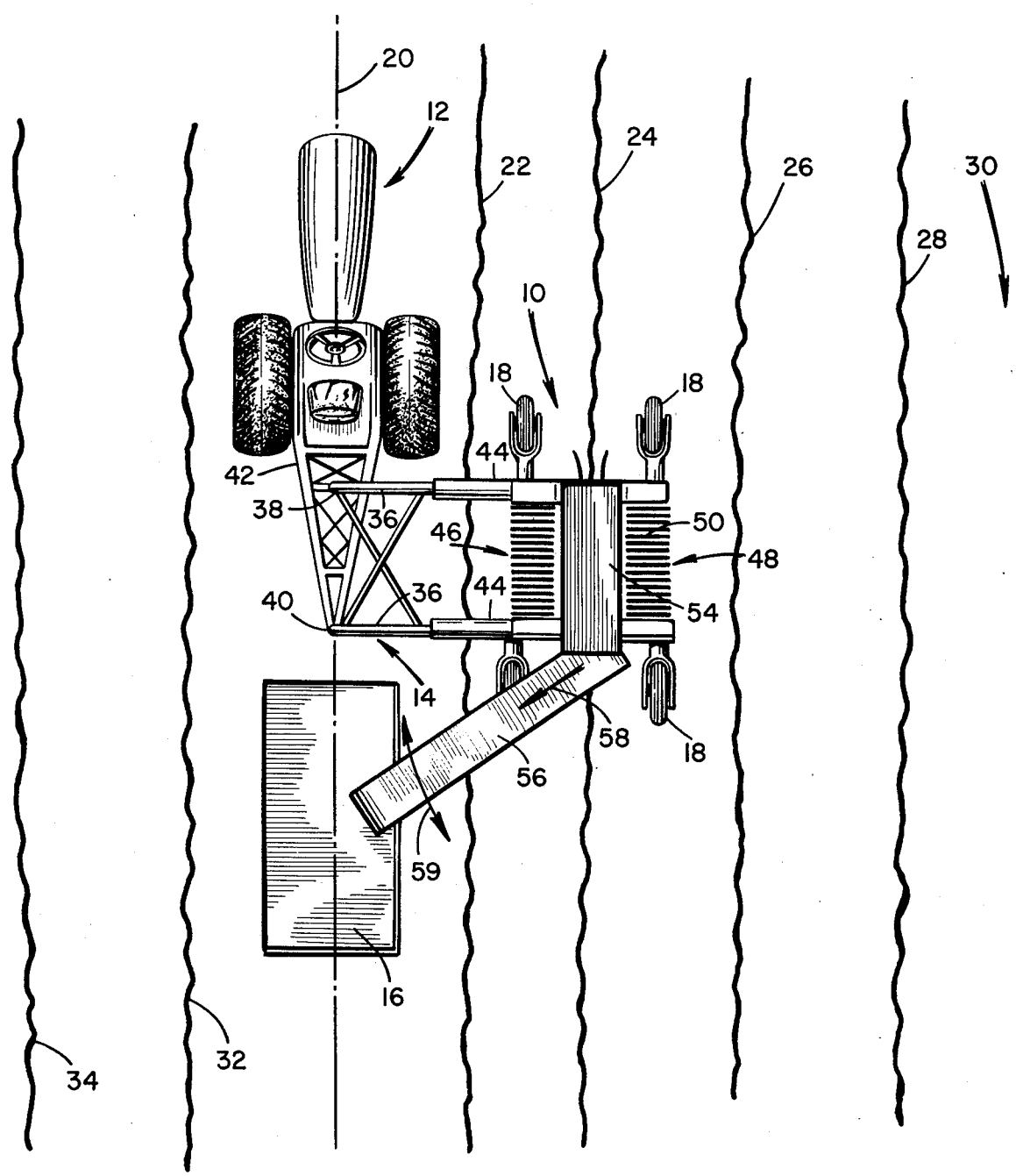
FIG. 1 is a plan view of the inventive automatic tobacco harvester towed by a tractor through a tobacco field.

With reference first to FIG. 1, an overall view of the inventive automatic tobacco harvester when in use will be described. The inventive harvester is shown generally at 10, and is towed by a conventional tractor 12 by way of a towing bridge 14 integral with the harvester. A wheeled cart 16 is also connected to and towed by tractor 12. Pairs of wheels 18 support the harvester 10 and roll along the ground on opposite sides of the row of tobacco being harvested.

As noted above, tobacco is customarily grown in a five-row pattern. Every fifth row is left unplanted, with the unplanted row being designated in FIG. 1 at 20. Four successive spaced rows of tobacco, designated 22, 24, 26 and 28, respectively, lie to the right of unplanted row 20, with the numeral 30 generally designating the next unplanted row. On the left of unplanted row 20 are four successive planted rows, two of which are shown at 32 and 34. The tractor 12 and its associated cart 16, ride over the unplanted rows 20 of the tobacco field. As illustrated in FIG. 1, the harvester 10 is removing tobacco leaves from the stalks in row 24, with the wheels 18 riding between rows 22 and 24, and 24 and 26, respectively. As such, the harvester 10 is in its extended position.

In harvesting rows 22 through 28 with the inventive harvester 10, row 24 is harvested as shown by driving the tractor up row 20. Row 26, is then harvested by driving the tractor 12 down row 30. Next, harvester 10 is moved toward tractor 12, into its retracted position, by telescoping its arms 44 along mating arms 36 of the bridge 14. In this retracted position, tobacco in row 22 is harvested by again driving tractor 12 up row 20, while the row 28 is harvested by driving the tractor down row 30. In actual fact, the harvester 10 would not be shifted for each four rows harvested. Rather, the tractor would cover the field twice, once with the harvester in each of its two positions. And each time the field would be traversed, the tractor would run along each unplanted row twice — once in each direction.

As the tractor 12 rides along the row 20, the tobacco in the row 24 is being removed from the tobacco stalks. As will be explained in greater detail below, this tobacco is carried up the sides 46 and 48 of the harvester 10 by way of mating belts 50 and chains 52 (FIG. 2), and falls onto a first driven wide-belt conveyor 54. From conveyor 54, the tobacco leaves are transported to a second driven conveyor 56, and are moved in the direction of arrow 58 toward the cart 16. The second conveyor 56 is adapted to be pivoted in the direction of arrow 59 so that the tobacco falling from the discharge end of conveyor 56 is evenly distributed in the cart 16.

Figure 2:
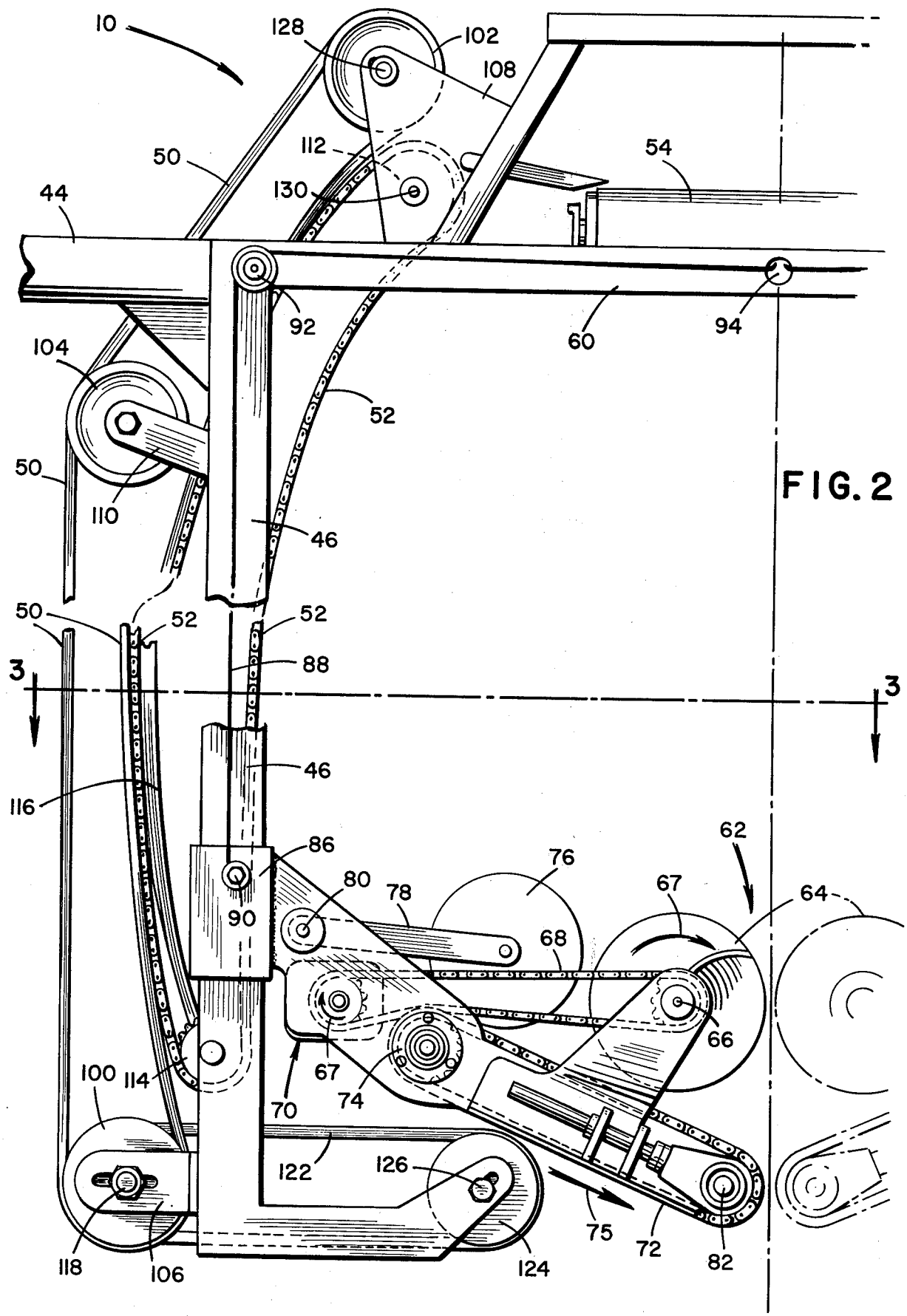
FIG. 2 is a rear elevation of the harvester illustrated in FIG. 1.
Figure 3:
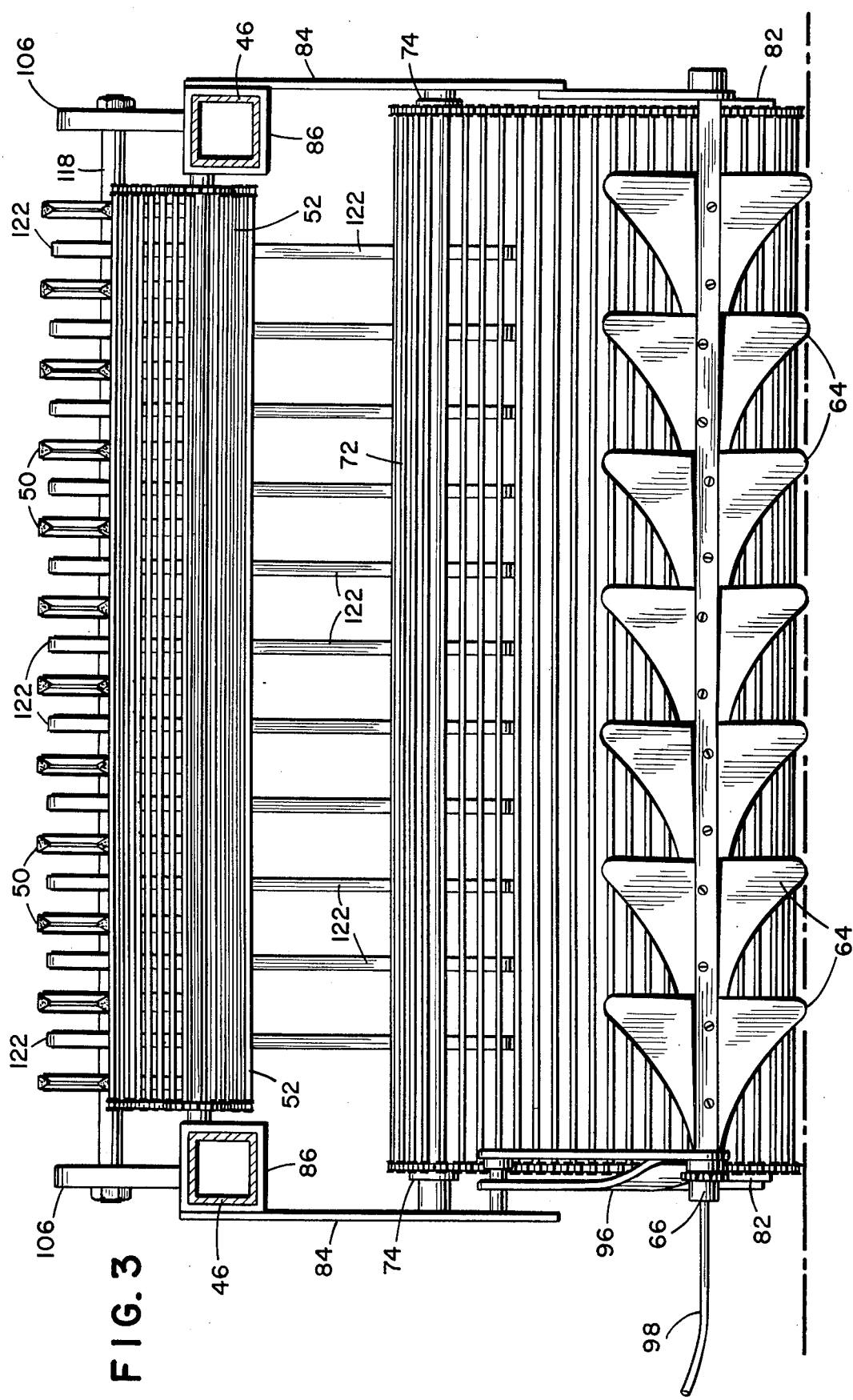
FIG. 3 is a cross section of the inventive harvester taken along line 3—3 of FIG. 2.
Figure 4:
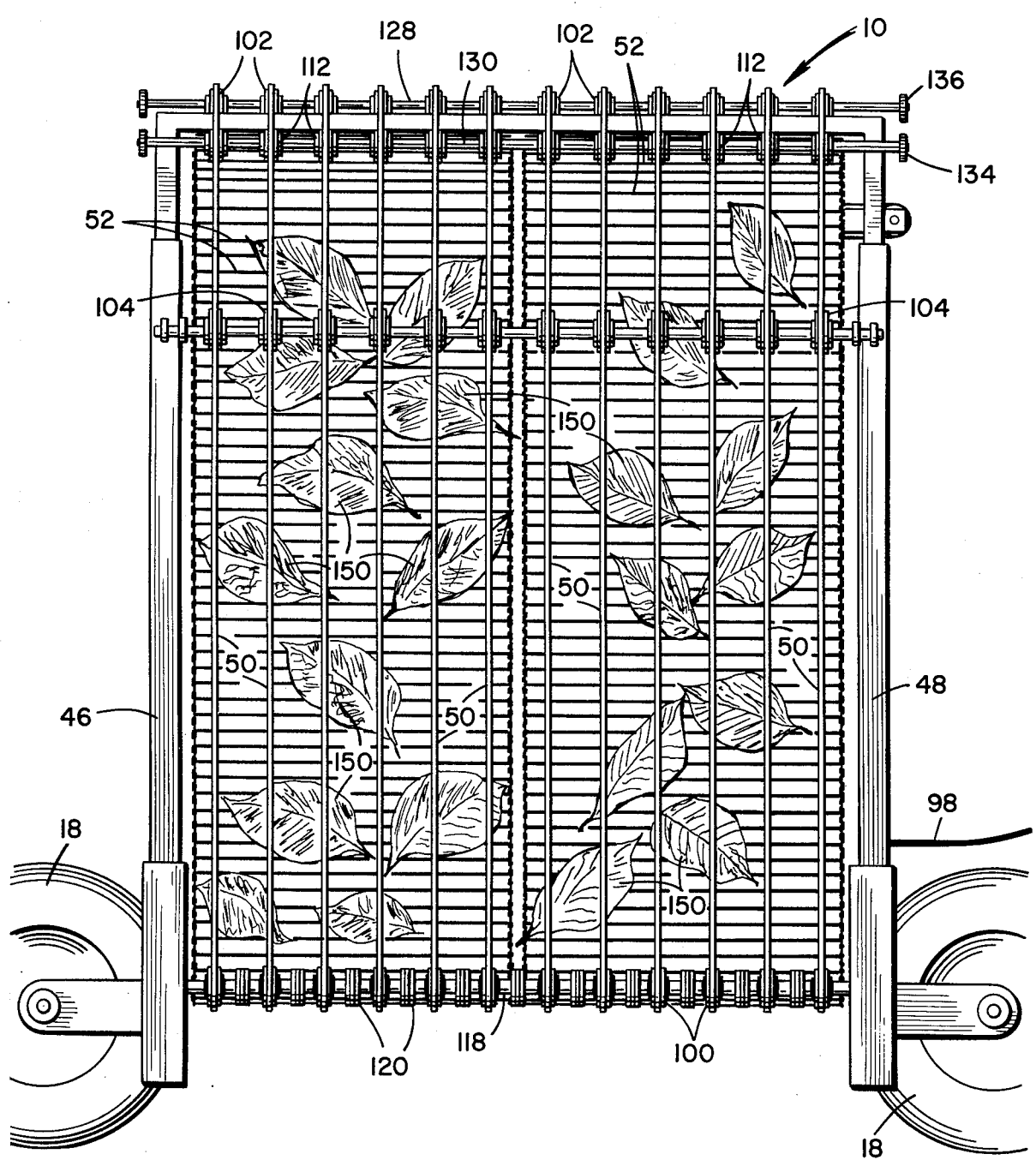
FIG. 4 is a side elevation of the harvester illustrated in FIG. 1.

With reference now to FIGS. 2 through 4, the details of the inventive tobacco harvester 10 will be described. The harvester 10 is open at its center, defined by side frame elements 46 and 48, top frame element 60, and a bottom harvesting mechanism indicated generally at 62. The harvesting mechanism 62 comprises a pair of oppositely rotating defoliating elements 64 which may be of any known design. Defoliators 64 are mounted for rotation about their respective axes 66 and are driven in the direction of arrows 67 by means of chains 68 by, for example, hydraulic motors designated generally at 70. Conventional chain-type conveyor belts 72 are driven by the respective drive chains 68 by means of sprocket wheels 74, and rotate in the directions indicated by arrows 75. A pair of conventional scavengers 76 are rotatably mounted on connecting arms 78, themselves pivotably mounted on shafts 80. As can be seen best in FIG. 2, the tension in chain conveyor 72 can be adjusted by moving the positions of the respective conveyor chain sprockets 82.

The side frames 46 and 48 of the harvester 10 are constructed of hollow posts having square cross sections. A defoliator and conveyor support 84 is mounted on each of the four vertical posts defining the harvester frame. The supports 84 are apertured to receive the shafts of the respective sprockets associating with the drive chains 68, the chain conveyor 72, scavengers 76 and defoliators 64. Each support 84 includes a telescoping portion 86 which conforms with the shape of its associated frame post.

Each of the supports 84 is slidably mounted on its respective vertical post and associates with a cable 88 bolted thereto, as at 90. As best seen in FIG. 2, the cable 88 runs up its associated post, over a pulley 92, and through an aperture 94 defined in the frame member forming a part of the top 60. The four cables 88 are joined together at a common location, and associate with an actuating mechanism such as a manually operated boat winch (not shown). In this manner, operation of the winch raises or lowers all of the supports 84 in unison, sliding the supports along their respective vertical frame posts so that the entire defoliating mechanism is moved in a vertical direction. In this manner, the height of the defoliating mechanism can be adjusted in accordance with the height of the tobacco leaves on the stalks which are being harvested.

It should also be appreciated that the defoliating elements 64 are equipped, as is conventional, with a mechanism by which the forwardmost regions thereof can be raised and lowered relative to the rearward regions to form any desired angle with the horizontal. In this manner, the number of leaves stripped from a stalk can be adjusted as desired. With the defoliators substantially horizontal, only a few leaves along the stalk will be stripped. However, as the axes of the defoliators are adjusted to define a large angle with the horizontal, substantially all of the leaves along the stalk can be removed. The means for adjusting the angle of the defoliators are best seen in FIG. 3 as pivoting brackets 96. Also illustrated in FIG. 3 are a pair of cooperating guide rods 98 which serve to guide the tobacco stalks toward the defoliators 64 as the harvester 10 moves along the rows of tobacco.

As best seen in FIGS. 2 and 4, there are 12 V-belts 50 extending from the bottom to the top of the substantially vertical side frames of the harvester 10. Each belt 50 travels around a lower pulley 100, an upper pulley 102, and an intermediate guide pulley 104. The pulleys 100, 102 and 104 are fixed to the harvester frame by means of respective mounting brackets 106, 108 and 110.

Continuous chain 52 is also mounted integral with the harvester frame. In this regard, the chain 52 is guided between upper and lower sprockets 112 and 114, respectively. And to maintain the central outer portion of chain 52 in contact with the respective V-belts 50, a guide 116 is mounted on the harvester frame, and serves as a surface on which the moving continuous chain 52 slides. Preferably, the respective left and right guides 116 are faced with a material such as nylon or Teflon so as to avoid excessive wear between the chains 52 and the guides 116.

With particular reference to FIGS. 2 and 4, it can be seen that lower belt pulleys 100 are adjustably mounted on a common shaft 118. Also fixed to shaft 118 is a plurality of pulleys 120, alternately positioned with respect to pulleys 100, and associated with an equal number of short, substantially horizontal V-belts 122. The opposite end portions of the respective V-belts 122 turn around pulleys 124 mounted on a common shaft 126.

As best seen in FIG. 4, the upper belt pulleys 102 are fixedly mounted on a common shaft 128, while the chain pulleys 112 are in turn fixedly mounted on a common shaft 130. A hydraulic motor (not shown) drives each of the two sets of V-belts 50, chains 52 and V-belts 122. Each hydraulic motor is connected to and drives one of the upper chain sprockets 112 at the rear of the harvester 10. Then, by a chain-drive configuration, at the front of the harvester, the left chain shaft 130, through its sprocket 134, drives the right belt shaft 128 through its sprocket 136. At the same time, the right chain shaft 130, through its sprocket 134, is coupled to the left sprocket 136 of belt shaft 128 by a continuous chain (not shown). From the above, it should be evident that the hydraulic motors directly drive the respective chains 52 and that the couplings between the chains 52 and V-belts 50 drive the belts 50 in unison with the chains 52. Then, at the lower region of the harvester 10, the belts 50 rotate their respective pulleys 100 and hence the shaft 118 on which they are fixed. Rotation of the shaft 118, in turn, drives pulleys 120 and hence the respective V-belts 122. Two additional hydraulic motors (not shown) drive the defoliators 64 and chain conveyors 72 in unison through the respective linking sprockets 74.

Figure 5:
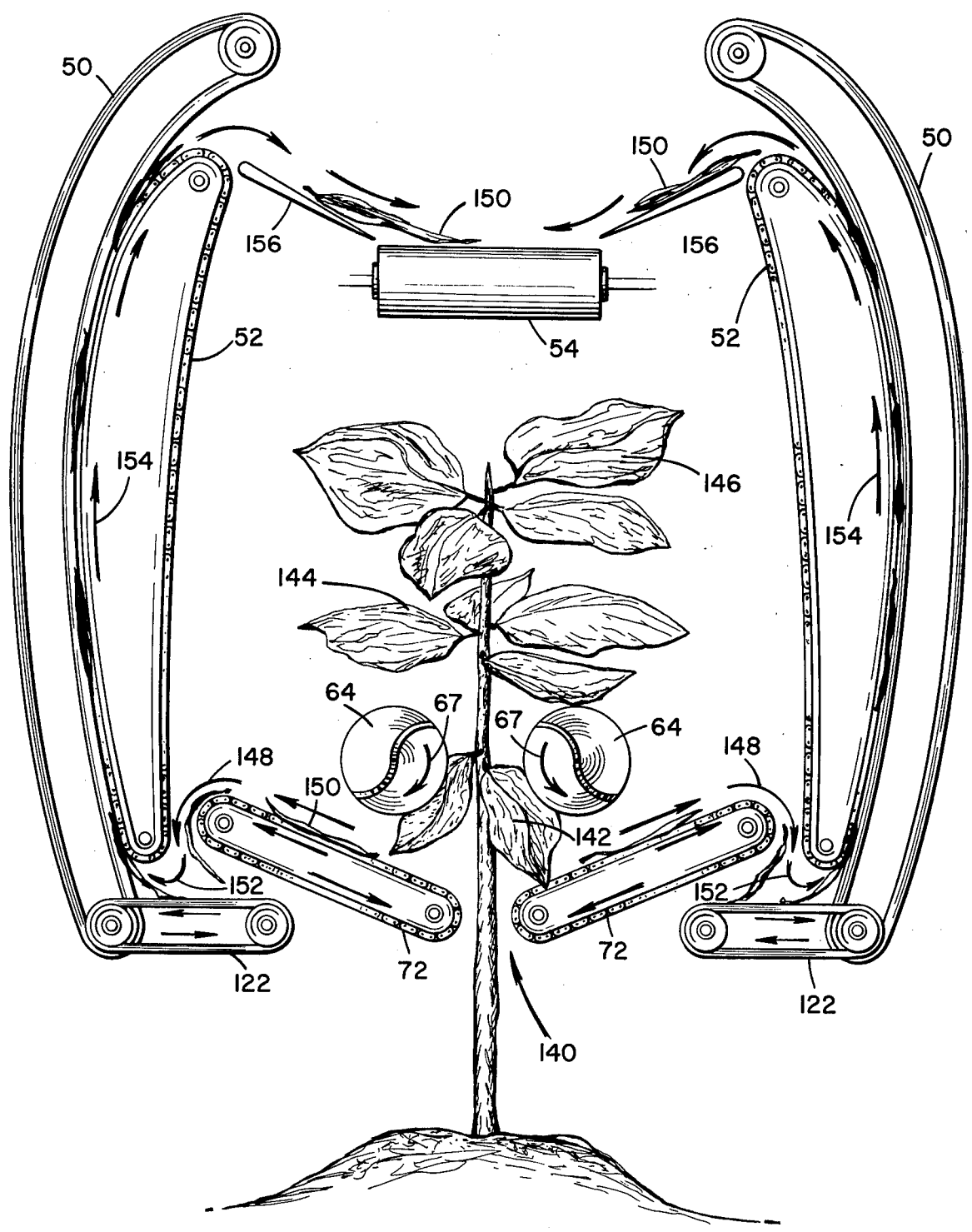
FIG. 5 is a schematic illustrating the operation of the inventive harvester.

With reference now to FIG. 5, the operation of the inventive harvester will be described. In this Figure, a tobacco stalk is shown generally at 140, having tobacco leaves in respective tiers 142, 144 and 146. As illustrated, the defoliators 64 are set at a height to remove the tobacco leaves in tier 142 of the stalks 140 in the tobacco row being harvested. This is accomplished as the harvester moves along the tobacco row. The tobacco leaves are removed from their respective stalks through the means of the defoliators 64 which rotate in the direction of arrows 67. As the leaves fall, they are picked up by chain conveyors 72, and are carried in the direction of arrows 148. The leaves continue toward the respective sides of the harvester, until they are dropped from the chain conveyor 72 onto belts 122. The tobacco leaves, shown at 150, travel along the V-belts 122 in the direction of the arrows 152. The tobacco leaves 150 are then captured by the cooperation between the mating faces of the belts 50 and the chain conveyor 52. The leaves move upwardly, in the direction of arrows 154, until they reach the top of chain conveyor 52. Then, the leaves drop onto the wide-belt conveyor 54, and are carried to conveyor 56 for delivery to cart 16 being towed by tractor 12, shown best in FIG. 1.

A pair of guides 156 at the top of the harvester can be seen in FIG. 5, and serve to guide the tobacco leaves 150 from the discharge end of chain conveyor 52 to the wide-belt conveyor 54. Additional guides (not shown) may be provided to ensure that the tobacco leaves stripped by the defoliators 64 are directed to chain conveyor 72. Guides may also be provided to direct the leaves which fall from chain conveyor 72 to the V-belt conveyor 122, especially when stripping leaves from the higher regions of the stalks, such as in tier 146.

The harvester may be modified by driving the front wheel so that turning forces are not developed between the harvester and the towing tractor. For example, one of the hydraulic motors may be connected to this wheel, and in addition, the short horizontal V-belt may be replaced by a wide flat belt extending between the long vertical V-belt. In this manner, sand which drops from the tobacco leaves will be brought to the side of the harvester and dropped to the ground.

Above, a specific embodiment of the present invention has been described. It should be understood that this description has been advanced for purposes of illustration only, and is in no way intended to limit the scope of the present invention. Rather, it is the intention that the present invention be limited only as defined in the appended claims.

I claim:

1. A harvester for traveling through the rows of tobacco in a tobacco field, for stripping tobacco leaves from their stalks, and for transporting the stripped leaves to a stowage site, the harvester comprising: a main frame having first and second substantially vertical sides spaced apart a distance to accommodate a row of tobacco stalks therebetween, a front region and a rear region, said main frame adapted to be aligned with its first and second sides substantially parallel to the rows of tobacco in said field; defoliator means centrally mounted on said main frame between said first and second sides for stripping tobacco leaves from their stalks; first conveyor means positioned substantially beneath said defoliator means for receiving the tobacco leaves stripped from the stalks and for conveying the same from the region of said defoliator means toward discharge sites at said first and second sides; second substantially vertical conveyor means associating with said first and second sides, for receiving the tobacco leaves from said first conveyor means at said discharge sites, and for conveying the tobacco leaves in a substantially vertical direction along said first and second sides to further discharge sites; and third conveyor means for receiving the tobacco leaves from said second conveyor means, at said further discharge sites, and for transporting the same to said stowage site; wherein said second conveyor means comprises at least one continuous chain conveyor extending from the front to the rear regions of said main frame; motive means for moving one substantially planar surface of said chain conveyor in a vertically upward direction; a plurality of continuous narrow belts extending from the front to the rear regions of said main frame, and cooperating with said chain conveyor; motive means for moving one surface defined by said plurality of narrow belts in the same vertically upward direction as said one surface of said chain conveyor; and means for urging said one surface of said chain conveyor and said one surface of said plurality of narrow belts toward one another; and wherein said second conveyor means transports tobacco leaves between the cooperating surfaces of said chain conveyor and said plurality of narrow belts.

2. The harvester recited in claim 1, wherein said first conveyor means is a continuous chain conveyor.

3. The harvester recited in claim 1, and further comprising: guide means for guiding tobacco leaves from said first to said second conveyor means.

4. The harvester recited in claim 1, and further comprising: wheel means connected to said frame so that said harvester is self-standing and capable of rolling in a tobacco field.

5. The harvester recited in claim 4, wherein said wheel means are spaced apart on the order of 96 inches.

6. The harvester recited in claim 4, and further comprising: bridge means for connecting said harvester to a conventional tractor.

7. The harvester recited in claim 6, wherein said stowage site is positioned at a location towed by said tractor.

8. The harvester recited in claim 6, wherein said bridge means is a telescoping connection so that the distance between said harvester and said tractor is adjustable.

9. The harvester recited in claim 1, and further comprising: means for vertically adjusting said defoliator means and said first conveyor means relative to said frame.

10. A machine for stripping tobacco leaves off the stalks of rows of tobacco plants standing in a field and transporting the stripped leaves to a storage site which comprises:
 a. a mobile frame adapted to travel along a row of tobacco plants;
 b. defoliator means carried by said frame for stripping leaves from tobacco stalks as said frame travels along a row;
 c. a first conveyor means positioned beneath said defoliator means for receiving the tobacco leaves stripped from the stalks and conveying the same laterally;
 d. a second conveyor means for receiving the tobacco leaves from said first conveyor means, and for conveying the tobacco leaves in a vertical direction along at least one side of said frame, said second conveyor means including
  i. a continuous chain conveyor extending along the at least one side of said frame,
  ii. a plurality of vertically extending continuous narrow belts spaced along and cooperating with said chain conveyor,
  iii. means for urging one surface of said chain conveyor and one surface defined by said plurality of narrow belts toward one another, and
  iv. motive means for moving said one surface of the chain conveyor and said surface defined by said plurality of narrow belts in an upward direction whereby tobacco leaves between the cooperating surfaces are transported upwardly; and
 e. a third conveyor means for receiving the tobacco leaves from said second conveyor means and transporting the same longitudinally of said main frame to the storage site.

* * * * *